Figure 1:
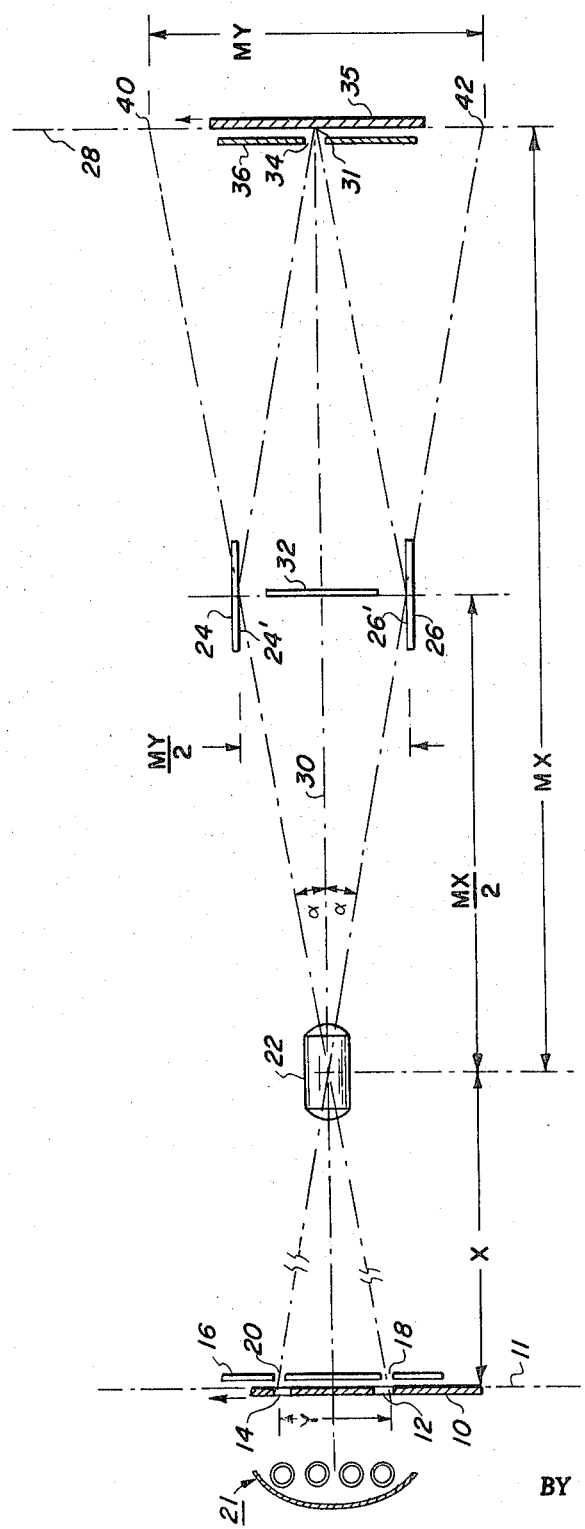

United States Patent [19]

Wharton

[11] 3,759,612

[45] Sept. 18, 1973

[54] OPTICAL SYSTEM
[75] Inventor: Armistead Wharton, Henrietta, N.Y.
[73] Assignee: Xerox Corporation, Stamford, Conn.
[22] Filed: Dec. 13, 1971
[21] Appl. No.: 207,090

[52] U.S. Cl. .................................. 355/46, 355/50
[51] Int. Cl. ......................................... G03b 27/44
[58] Field of Search .................. 95/4.5; 355/33, 50, 355/46

[56] References Cited
UNITED STATES PATENTS
| | | | |
|---|---|---|---|
| 3,254,579 | 6/1966 | Higonnet | 95/4.5 |
| 3,349,677 | 10/1967 | Young | 95/4.5 |
| 2,066,679 | 1/1937 | Fischer | 355/33 |
| 3,580,675 | 5/1971 | Hieber et al. | 355/50 |
| 3,584,950 | 6/1971 | Gundlach | 355/50 |

Primary Examiner—John M. Horan
Attorney—James J. Ralabate et al.

[57] ABSTRACT

An optical system for simultaneously superimposing optical images from two separated object means on a single common line at the imaging point is disclosed. The system includes a fixed object lens and two plane reflecting means located equidistant from the lens center and the imaging plane, the reflecting means being mounted geometrically parallel to each other, optically parallel to the optic axis and equally spaced therefrom. The object means may be transparencies or opaque documents. The system may be utilized in a slit-scanning mode of operation or can be used to project and superimpose full frame images or areas in the imaging plane. The system may also be utilized to generate two identical images from a single original.

7 Claims, 2 Drawing Figures

INVENTOR.
ARMISTEAD WHARTON

OPTICAL SYSTEM

BACKGROUND OF THE INVENTION

This invention relates to an optical system for forming images and more specifically to an optical system capable of superimposing separate images on a common line or area at the imaging point.

There are many applications wherein it is desired to superimpose images obtained from two separate originals on a common line or area at an imaging point. One such application is in a photoelectrophoretic imaging system which is described in detail in U.S. Pats. Nos. 3,383,993; 3,384,565 and 3,384,566. In photoelectrophoretic imaging, generally speaking, a layer of an imaging suspension comprising electrically photosensitive pigment particles in a carrier liquid is arranged between two electrodes, one of which is at least partially transparent, exposed to an imagewise pattern of activating electromagnetic radiation correspondint to an original image to be reproduced and subjected to an electric field whereby complementary images are formed on the surfaces of the electrodes.

Typically the imaging area is smaller than the area of the imaging suspension in order to ensure that the complete image is reproduced. However this usually results in a dark or colored border being formed around the reproduced image which is undesirable in a commercial imaging system. Thus it would be desirable to be able to project a white border simultaneously with the projection of the original image on the suspension layer.

Previously known schemes for accomplishing superimposition of images at a common imaging point have typically utilized beam splitters. However beam splitter arrangements, as is well known, typically work at less than 50 percent efficienty. Thus to obtain a desired level of illumination at the imaging plane roughly twice that desired illuminance must be provided to illuminate the original image. In a commercial imaging system an optical arrangement which operates at less than 50 percent efficiency would require considerably higher power levels to provide the necessary illuminance at the imaging point. This type of an arrangement would obviously be highly disadvantageous from an economical viewpoint. Furthermore, cooling of the equipment in such an arrangement could become a troublesome problem, necessitating additional apparatus and thereby undesirably complicating the overall device configuration. Thus in an instance such as that described above it would be desirable to have a method for superimposing optical images which operates at substantially full optical light efficiency.

SUMMARY OF THE INVENTION

It is therefore an object of this invention to provide an optical system which overcomes the above-noted disadvantages and which provides the above-described desirable features.

A further object of the invention is to provide a simple single lens optical system.

It is another object of the invention to provide an optical system for simultaneously superimposing images from two separated original images on a single common line at an imaging point.

It is a further object of the invention to provide such a system which operates at substantially full optical light efficiency.

It is still another object of the invention to provide such an optical system wherein both separated original images may be mounted in a single scanning carriage.

Yet another object of the invention is to provide such an optical system which may be used for full frame projection and superimposition without scanning.

It is a still further object of the invention to provide an optical system which may be utilized to generate two identical separated images from a single original.

These and other objects and advantages are accomplished in accordance with the invention by providing an optical system in which a single fixed lens is capable of projecting and superimposing images from two separated original objects on a single common line or area at the imaging plane. The single fixed lens views and projects the illuminated original images to two plane reflecting means located equidistant from the lens center and the imaging plane. The plane reflecting means are mounted plane parallel to each other, optically parallel to the optical axis and equally spaced therefrom. The projected images strike the reflecting means and are reversed and directed to the final imaging point or area where they are superimposed on each other.

The novel optical system of the invention may be utilized in a slit-scanning mode of operation or in a full frame projection mode without scanning. The original objects may be transparencies or they may be opaque documents.

Except for minor mirror losses the optical system of the invention operates at substantially full optical light efficiency in contrast with beam splitter arrangements which usually work at less than 50 percent efficiency. The system also offers the advantage that both original images can be mounted in the same carriage.

Figure 2:
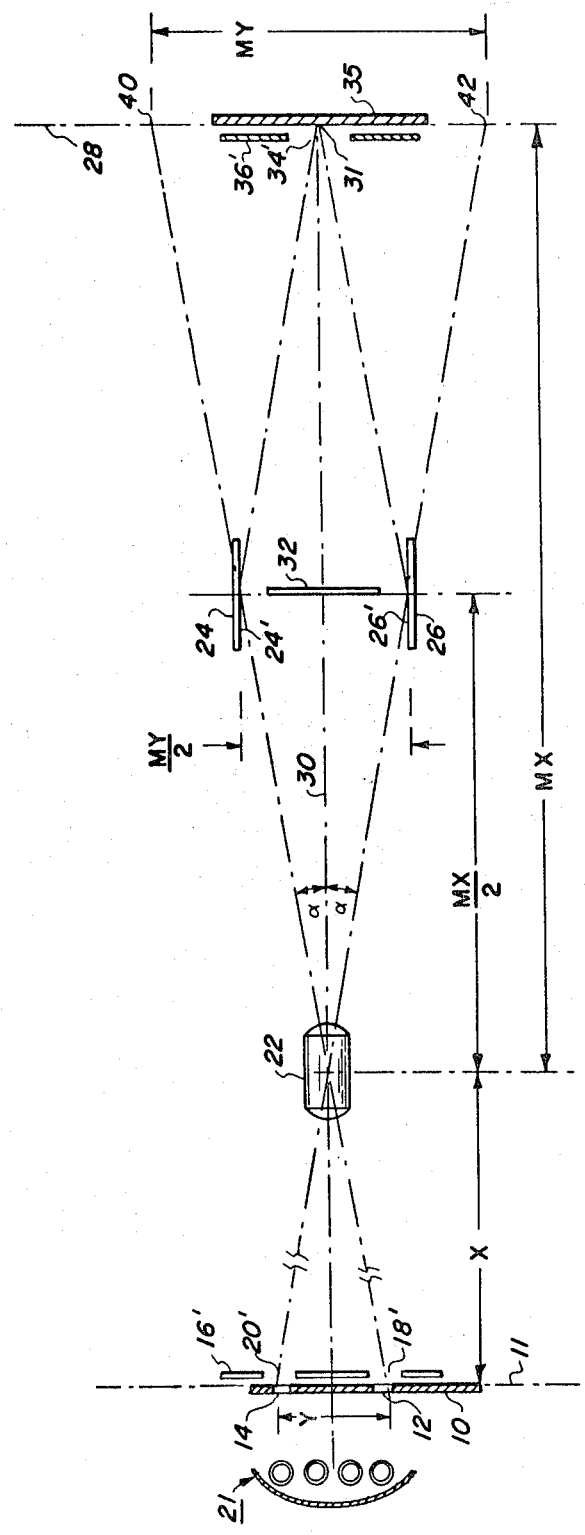

The invention will be more fully understood from the following detailed description of various preferred embodiments thereof particularly when read in conjunction with the accompanying drawings wherein:

FIG. 1 is a partially schematic cross-sectional view illustrating a preferred embodiment of the invention; and FIG. 2 is a partially schematic cross-sectional view illustrating another preferred embodiment of the invention.

Referring now to FIG. 1 there is seen a scanning carriage 10 positioned at the film plane 11 and which moves in the direction indicated by the arrow. The scanning carriage is capable of carrying at least two separated original objects; original objects 12 and 14 are shown for the purpose of illustration. The original images which can be superimposed at a common point according to the optical system of the invention are typically provided in the form of transparencies and, in a preferred instance, may be a 35 mm original slide and a border generating slide. Although the invention is described, in this illustrative instance, with respect to the slit-scanning mode of operation it should be recognized that it may be employed for full frame projection without scanning. Adjacent to scanning carriage 10 is located a fixed slit mask, generally designated 16, having slits 18 and 20. Original objects 12 and 14 are positioned in the scanning carriage so as to arrive simultaneously at slits 18 and 20 respectively. As the scanning carriage transports the original objects 12 and 14 past slits 18 and 20 respectively, the objects are illuminated by means of light sources 21 located behind the scanning carriage.

Although the invention is being described in detail with respect to the superimposition of images or original objects which are in the form of transparencies it will, of course, be obvious to those skilled in the art that when the system is utilized to operate with opaque documents the light sources 21 will be positioned on the opposite side of the imaging position from that shown.

The illuminated objects at slits 18 and 20 are viewed by fixed projection lens 22. Projection lens 22 typically has a wide enough field to pick up light from both of the illuminated objects 12 and 14. The fixed lens 22 projects images of the illuminated objects to two flat mirrors 24 and 26 located equidistant from the lens center and the imaging plane 28. Mirrors 24 and 26 are preferably first surface mirrors having reflecting surfaces 24' and 26' respectively and are mounted plane parallel to each other, parallel to the optic axis 30 and equally spaced therefrom. First surface mirrors, i.e., those having a reflecting coating on one of the glass surfaces which is usually a vacuum deposited aluminum film protected by a thin transparent overcoating of silicon monoxide, are typically necessary to prevent "ghost" images from being formed at the imaging plane. The mirrors 24 and 26 reverse the sense of the projected images from slits 18 and 20 respectively and direct the projected images to the final imaging points 31 at the imaging plane. Of course any light reflecting materials such as, for example, prisms may be used according to the invention. Positioned between mirrors 24 and 26 is optional light baffle 32 which is preferably arranged to prevent any undesired light from reaching the imaging plane.

The projected images are directed through slit 34 of fixed imaging slit mask 36 and are superimposed at the final imaging area 31 on the image receiving member 35 which is located at the imaging plane 28. The image receiving member 35 may be any of many different materials such as, for example, a photoconductive insulating surface, a photographic film, a traveling web, etc. Of course where the scanning mode of operation is practiced and the scanning carriage 10 moves in the direction of the arrow, the image receiving member 35 will also be moved in the direction of the arrow. Alternatively the scanning mode of operation may also be practiced by holding the scanning carriage 10 and image receiving member 35 fixed and moving the other elements of the apparatus with relation to them.

Any desired magnification can be obtained by adjusting the spacing of the various elements of the optical system. The following discussion concerning the arrangement of the elements of the system will be illustrative.

Let $y$ designate the spacing between the two original transparencies at the viewing slits 18 and 20. Then by geometric triangulation, the spacing between the projected real images 40 and 42 will be $MY$ where $M$ is the magnification ratio. Also by geometry, the spacing between the two mirrors 24 and 26 will be $MY/2$. Using the common lens formulae, the relations between object distance, image distance, focal length and magnification can be readily established as follows: if $X$ represents the object distance, then $MX$ will be the image distance and $1/X + 1/MX = 1/F$ where $F$ is the focal length of the lens. Then $F = (MX/M + 1)$ $X = F(M + 1)/M$ and $MX = F(M+1)$ so that one variable can be determined if the other two variables are known. It is seen that both of the images projected by fixed lens 22 to the mirrors 24 and 26 define an angle $\alpha$ with respect to the optic axis 30. Angle $\alpha$ can be expressed in terms of $X$ and $Y$ since $\alpha = \tan^{-1} Y/2$.

The optical system of the present invention can operate at various magnifications as has been seen. However the system becomes large and unwiedly as the ratio of the conjugates becomes larger. In a preferred embodiment of the invention wherein the novel optical system is employed to produce enlarged reproductions from relatively small (e.g., 35 mm) transparencies it is particularly preferred to use magnifications in the general range of 1:2 to 1:8. Where the optical system is used to reproduce opaque originals a magnification ratio of 1:1 will usually be preferred. For example, document copying equipment, either of the scanning type or the full frame exposure type typically requires the copy to be about the same size as the original. Of course it will be recognized that the optical system may be used in a demagnification mode where it is desired to form optical images at the imaging point which are smaller than the original objects sought to be superimposed.

It will be further appreciated by those skilled in the art that when the slit scanning mode of operation is practiced with a moving scanning carriage and a moving optical image receiving member and the system is arranged for a 1:1 magnification ratio, the scanning carriage and the optical image receiving member will typically be moved in the same direction at the same speed. If the same mode of operation is practiced with a different magnification ratio then the optical image receiving member will typically be moved at a different ratio of speed relative to the scanning carriage corresponding to the particular magnification ratio used. For example if a magnification ratio of about 3:1 is used the optical image receiving member will typically be moved at a rate of speed about three times faster than the rate of speed at which the scanning carriage is moved.

FIG. 2 illustrates the practice of the invention in the full frame projection mode. The apparatus shown in FIG. 2 is similar to that shown in FIG. 1 with like elements being designated with like numerals. In this mode of operation the object carriage and the image receiving member are stationary. It will be noted that slits 18' and 20' of fixed slit mask 16' and slit 34' of fixed imaging slit mask 36' are larger than the corresponding slits in FIG. 1.

Although the optical system has been described with respect to a preferred embodiment of the invention wherein the novel optical system is advantageously utilized to superimpose projected images from two separated original images it should be recognized that it may also be used to generate two identical separated images from a single original object. According to this embodiment of the invention the apparatus configuration is identical with that shown in FIG. 1 and FIG. 2 with the exception that the object plane and the imaging plane are reversed. In other words the object plane shown in the drawings becomes the imaging plane and the imaging plane becomes the object plane. Of course the light sources must be positioned behind the original object at the film plane.

While the novel optical system has been described in detail with respect to simultaneous superimposition of transparencies it will be readily apparent that the invention is not limited to this embodiment. Images of illuminated opaque documents may be projected and superimposed using the same optical elements and arrangements and this may be accomplished in either the moving, slit-scanning mode or, preferably, the fixed full-frame mode. It will also be apparent that a further capability of the novel optical system resides in the superimposition of images from an illuminated opaque document and an illuminated transparency.

There has been described an efficient and highly advantageous optical system. While the invention has been illustrated relative to particular preferred embodiments thereof it is not intended to be limited thereto but rather it will be appreciated by those skilled in the art that modifications and variations are possible which are within the spirit of he invention and the scope of the claims.

What is claimed is:

1. An optical apparatus including the following disposed along an optical axis:
   a. a projection lens disposed between conjugate object and image planes,
   b. a mask disposed adjacent said object plane and defining a plurality of apertures all spaced equidistant from said optical axis for the propagation, through each of said apertures, of light from said object plane along projection axes extending from said apertures through said projection lens to said image plane,
   c. a reflecting surface, facing said optical axis and spaced therefrom, disposed in each projection axis so that the point of incidence of said projection axis on said reflecting surface is midway between said projection lens and said image plane, and
   d. a movable object carriage to move objects in said object plane and to position said objects in registry with said apertures,
   whereby light rays propagating from said object plane through said apertures form images at said image plane in upright and overlapping position and an image receiving means located at said image plane and arranged for movement in the same direction as that of said object carriage.

2. The apparatus as defined in claim 1 wherein the magnification ratio is from about 1:2 to about 1:8.

3. The apparatus as defined in claim 1 wherein the magnification ratio is about 1:1.

4. An optical apparatus as defined in claim 1 wherein said reflecting surfaces and said apertures are equal in number,
   said reflecting surfaces being disposed in an array symmetrical to that of said apertures with respect to said optical axis.

5. An optical apparatus as defined in claim 1 in which said object distance is a value X, said image distance is MX (where M equals the lateral magnification of the system), said apertures are spaced apart on their centers by a value Y, and said reflecting surfaces are correspondingly spaced apart by a value MY/2.

6. An optical apparatus as defined in claim 1 in which said object carriage includes means to sequentially introduce combinations of objects in registry with said apertures.

7. An optical apparatus as defined in claim 1 in which said apertures and mirrors are two in number and said object carriage is effective to sequentially introduce pairs of objects in simultaneous registry with said apertures.

* * * * *